B. T. BOUMA.
POULTRY ROOST.
APPLICATION FILED FEB. 6, 1917.
1,246,705.
Patented Nov. 13, 1917.
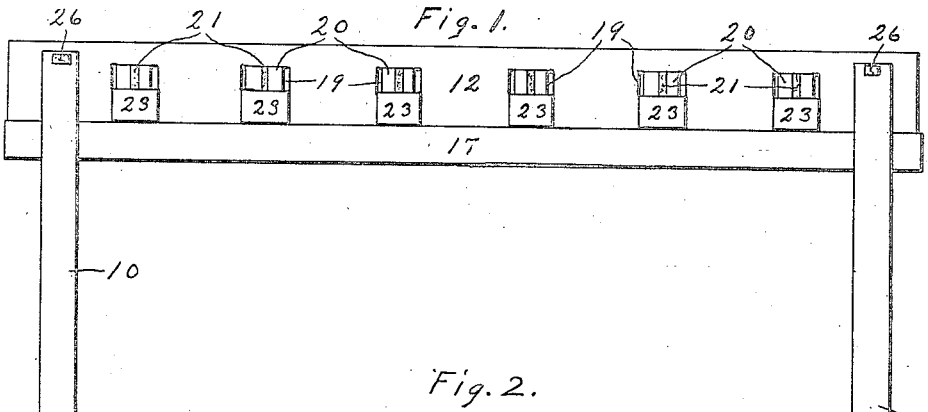
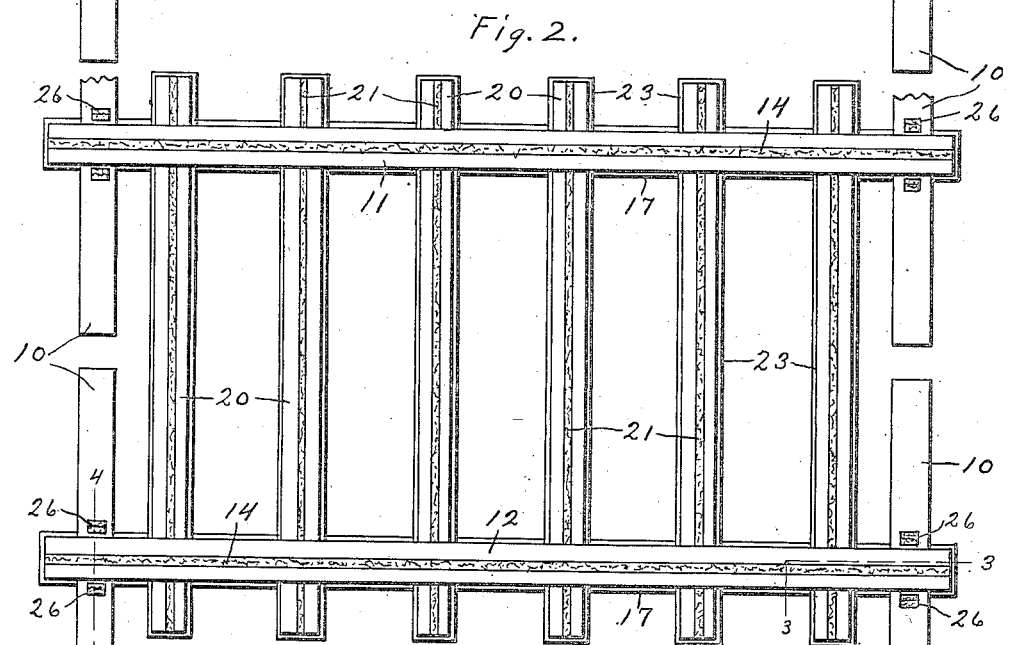
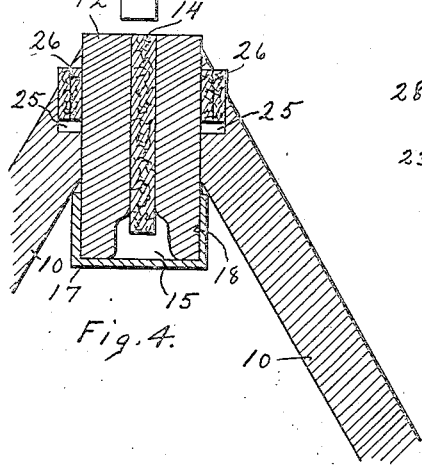
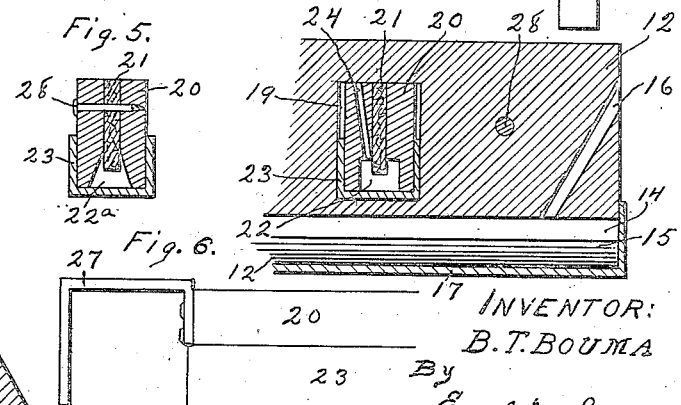
INVENTOR:
B. T. BOUMA
By
Earl M. Sinclair
Atty.

UNITED STATES PATENT OFFICE.

BENJAMIN T. BOUMA, OF LYNNVILLE, IOWA, ASSIGNOR TO N. M. BOUMA, OF LYNNVILLE, IOWA.

POULTRY-ROOST.

1,246,705.

Specification of Letters Patent.

Patented Nov. 13, 1917.

Application filed February 6, 1917. Serial No. 146,904.

*To all whom it may concern:*

Be it known that I, BENJAMIN T. BOUMA, citizen of the United States of America, and resident of Lynnville, Jasper county, Iowa, have invented a new and useful Poultry-Roost, of which the following is a specification.

The object of this invention is to provide an improved construction for anti-vermin poultry roosts and perches.

A further object of this invention is to provide a poultry roost which is of such construction that a disinfectant can be easily applied to all of the perches and other parts of the roost to destroy or prevent the presence of vermin.

A further object of this invention is to provide a device of this character in which the disinfectant will be held from dripping from the perches and in which a single application of disinfectant will last for a considerable period of time.

A further object of this invention is to provide an improved construction to adapt the perches to use in other situations for the destruction and prevention of the presence of vermin.

My invention consists in the construction, arrangement and combination of elements hereinafter set forth, pointed out in my claims and illustrated by the accompanying drawing, in which—

Figure 1 is a side elevation of my improved poultry roost. Fig. 2 is a plan, portions being broken away to economize space. Fig. 3 is an enlarged longitudinal section on the line 3—3 of Fig. 2. Fig. 4 is an enlarged transverse section on the line 4—4 of Fig. 2.

Fig. 5 is a cross-section of one of the perches detached, showing a slightly modified form.

Fig. 6 is a side elevation of one of the perches showing the attachment for adapting the device to use in other situations than in poultry houses.

This invention relates to and is an improvement on the device illustrated, described and claimed in my application filed September 16, 1915, Serial Number 51,079, allowed August 22, 1916, to which application reference hereby is made.

In the construction of the device as shown the numeral 10 designtes a plurality of supports on which are mounted the parallel sills 11, 12. Each sill 11, 12 preferably consists of two elongated strips of wood or other suitable material between which strips is disposed a longitudinally extending strip 14 of felt or other suitable absorbent material. At their lower inner margins the strips comprising the sills 11, 12 are cut away or grooved, whereby a channel 15 is formed at the base of and extending below the felt strip 14. At the end of each sill is formed an opening 16 which communicates with the longitudinal channel 15 thereof. Mounted beneath each of the sills 11, 12, and embracing and frictionally engaging the lower portion thereof is a pan 17 into which disinfectant is received and retained when introduced through the openings, and into which the lower margins of the felt strips 14 are received to draw up the disinfectant. These pans can very readily be removed for cleaning purposes, and if desired inwardly pressed lugs or points 18 may be formed on the sides of the pans to be pressed into the sides of the sills.

Each sill 11, 12 is formed with a plurality of spaced, transversely extending openings 19, in alinement in the two sills, and in said openings perch poles 20 are adapted to be removably and replaceably mounted by endwise movement, thus being supported by and between the sills. Each perch pole preferably is formed in a manner similar to the sills, of two strips of wood separated by a strip 21 of felt or the like, extending downwardly into a channel 22 extending lengthwise at the base of the pole, which is embraced by a removable and replaceable pan 23 to hold the disinfectant and pass it to the strips 21. As shown in Fig. 3 the channel 22 is rectangular in cross-section, and as shown in Fig. 5 the channel 22ᵃ is substantially triangular in cross-section, being formed with diverging sides. In each perch pole 20 is formed one or more vertical openings 24 communicating with the channel 22 or 22ᵃ and adapted to provide a means of ingress for the disinfectant thereto. I prefer to form the openings 24 at such points on the poles 20 that they are within the holes 19 and covered and protected by the sills in use.

Sockets or openings 25 may be formed in the upper ends of the supports 10, adjacent the sills 11, 12, and receive strips 26 of felt or like material. Disinfectant may be supplied to the sockets 25 and felt strips 26 to insure the destruction of any vermin that may lodge in the cracks between supports and sills.

In Fig. 6 I have shown a hook 27 attached to and extending longitudinally from the end of a perch pole 20, to engage a sill, beam or other support as desired, to hold the perch pole in desired position. Poles so equipped may be employed in other situations and places than the housing of poultry, as for instance beneath the mattress of a bed to insure the destruction of bed-bugs and other vermin.

One application of disinfectant to the devices constructed as shown and described will be effective for a considerable period of time, owing to the efficiency of the channeled bars with interposed felt strips, and the provision of the underlying pans. The strips comprising the sills and perches may be held together by nails, screws or bolts 28.

I claim as my invention—

1. A device of the class described, comprising spaced sills formed with longitudinal channels in their lower margins, pans removably and replaceably mounted on the lower margins of said sills and contacting with the bottom thereof and closing the lower sides of said channels, said sills being formed with spaced registering apertures, and perch poles mounted in said apertures and supported by and between said sills, said perch poles also being formed with longitudinal channels in their lower margins, absorbent strips extending upwardly from said channels to the tops of the poles, and pans removably mounted on their lower margins and closing the lower sides of said channels.

2. A device of the class described, comprising spaced sills formed with longitudinal channels in their lower margins, absorbent strips extending upwardly from said channels to the tops of the sills, and pans removably mounted on the lower margins of said sills and closing the bottoms of said channel, said sills being formed with spaced registering holes, intermediate of their upper and lower margins and perch poles removably mounted in the holes and supported by and between said sills, said perch poles being formed with longitudinal channels in their lower margins, absorbent strips extending upwardly from said channels to the tops of the poles, and pans fitted to the lower parts of said poles and closing the bottoms of the channels therein.

3. A device of the class described, comprising spaced sills, means for supporting said sills, said sills being formed with registering holes, and perch poles removably mounted through said holes and supported by and between said sills, said perch poles being formed with longitudinal channels in their lower margins, absorbent strips extending from said channels to the tops of the poles, and pans fitted tightly over the lower parts of said poles and having their edges in a plane above the tops of said channels.

4. A perch pole for poultry roosts, comprising a pair of parallel strips of material having spaced confronting faces, the upper parts of said confronting faces being parallel and the lower parts of said faces being spaced apart more than the upper parts, a felt strip held between the upper parallel parts of said faces and extending downwardly into the wider space between the lower parts of said faces, and a closure for the bottom and ends of the space between the lower parts of said strips, comprising an open topped pan fitted tightly but removably over the lower parts of said strips.

5. A perch pole for poultry roosts, comprising a pair of parallel strips of material having spaced confronting faces, the upper parts of which faces are parallel, the lower parts of said confronting faces being formed with longitudinal grooves whereby a channel is formed in the lower part of the perch pole, a strip of absorbent material held between the upper parallel parts of said confronting faces and extending downwardly into said channel, and a closure for the bottom and ends of said channel, comprising an open topped pan fitted tightly but removably over the lower parts of said strips and having its upper edge in a plane above the top of said channel.

6. A perch pole for poultry perches, consisting of a pair of parallel strips of material having spaced confronting faces, the upper parts of said confronting faces being parallel and the lower parts of said confronting faces diverging downwardly, a felt strip held between the parallel parts of the faces and extending downward into the space between the diverging parts, and a closure for the bottom and ends of the space between the diverging parts comprising an open topped pan fitted tightly but removably over the lower parts of said strips and having its edges in a plane above the top of the space between the diverging parts.

Signed by me at Lynnville, Iowa, this 30th day of January, 1917.

BENJAMIN T. BOUMA.